United States Patent
Nielsen

(10) Patent No.: US 8,997,934 B2
(45) Date of Patent: Apr. 7, 2015

(54) LUBRICATION SYSTEM FOR A GEAR SYSTEM PROVIDING EMERGENCY LUBRICATION

(75) Inventor: Thomas Korsgaard Nielsen, Vejle (DK)

(73) Assignee: Vestas Wind Systems A/S, Aarhus N. (DK)

( * ) Notice: Subject to any disclaimer, the term of this patent is extended or adjusted under 35 U.S.C. 154(b) by 340 days.

(21) Appl. No.: 13/503,197

(22) PCT Filed: Oct. 21, 2010

(86) PCT No.: PCT/EP2010/065872
§ 371 (c)(1),
(2), (4) Date: Apr. 20, 2012

(87) PCT Pub. No.: WO2011/048183
PCT Pub. Date: Apr. 28, 2011

(65) Prior Publication Data
US 2012/0211307 A1    Aug. 23, 2012

Related U.S. Application Data

(60) Provisional application No. 61/254,479, filed on Oct. 23, 2009.

(30) Foreign Application Priority Data

Oct. 23, 2009 (DK) .......................... PA 2009 70169

(51) Int. Cl.
*F03D 11/00* (2006.01)
*F16N 7/14* (2006.01)
*F16H 57/04* (2010.01)

(52) U.S. Cl.
CPC ........ *F03D 11/0008* (2013.01); *F16H 57/0447* (2013.01); *Y02E 10/722* (2013.01)

(58) Field of Classification Search
CPC ............ F16H 57/0447; F03D 11/0008; Y02E 10/722
USPC ................. 184/4, 6.12, 6.13; 416/146 A, 147
See application file for complete search history.

(56) References Cited

U.S. PATENT DOCUMENTS

| 4,762,201 A * | 8/1988 | Malik .......................... 184/6.13 |
| 5,101,936 A | 4/1992 | Paredes et al. |
| 7,052,429 B1 * | 5/2006 | Phanco et al. ................. 475/161 |
| 7,699,584 B2 * | 4/2010 | Mollhagen ................ 416/146 A |
| 8,215,912 B2 * | 7/2012 | Numajiri et al. .......... 416/146 A |
| 2011/0150655 A1 * | 6/2011 | Tietze et al. .............. 416/170 R |

(Continued)

FOREIGN PATENT DOCUMENTS

DE    10 2005 029 638    12/2006

(Continued)

OTHER PUBLICATIONS

Agnes Wittmann-Regis; International Preliminary Report on Patentability issued in priority International Application No. PCT/EP2010/065872; Apr. 24, 2012; 7 pages; The International Bureau of WIPO.

(Continued)

*Primary Examiner* — William E Dondero
*Assistant Examiner* — Robert T Reese
(74) *Attorney, Agent, or Firm* — Wood, Herron & Evans, LLP

(57) ABSTRACT

A lubrication system for a gear system for a wind turbine is disclosed. The lubrication system comprises a reservoir adapted to contain lubricant, first pump means arranged to supply lubricant from the reservoir to the gear system via a first fluid connection, and vacuum generating means arranged in fluid connection with the reservoir, thereby maintaining a total air pressure in the reservoir which is lower than an ambient pressure during normal operation. The lowered total air pressure in the reservoir draws lubricant from the gear system into the reservoir, thereby increasing the lubricant level in the reservoir and decreasing the lubricant level in the gear system, allowing the lubrication system to be operated in a 'dry sump mode'. In the case of an emergency or during start-up the vacuum generating means is stopped, thereby increasing the total air pressure in the reservoir. This causes a decrease in the lubricant level in the reservoir and an increase in the lubricant level in the gear system, allowing the lubrication system to be operated in a 'wet sump mode'.

14 Claims, 3 Drawing Sheets

(56) References Cited

U.S. PATENT DOCUMENTS

2011/0293425 A1* 12/2011 Numajiri et al. ............. 416/147

FOREIGN PATENT DOCUMENTS

| EP | 1 431 575 | 6/2004 |
| GB | 2 201 200 | 8/1988 |
| WO | 03/031812 | 4/2003 |

OTHER PUBLICATIONS

Niclas Skov Lindbaek; 1st Technical Examination and Search Report issued in priority Denmark Application No. PA 2009 70169; May 27, 2010; 5 pages; Denmark Patent and Trademark Office.

Marco Balice; International Search Report and Written Opinion issued in priority International Application No. PCT/EP2010/065872; Apr. 7, 2011; 10 pages; European Patent Office.

* cited by examiner

LUBRICATION SYSTEM FOR A GEAR SYSTEM PROVIDING EMERGENCY LUBRICATION

FIELD OF THE INVENTION

The present invention relates to a system for providing lubrication for a gear system of a wind turbine. More particularly, the present invention relates to a lubrication system which is operated in one state during normal operation and another state in the case that an emergency situation is occurring.

BACKGROUND OF THE INVENTION

Gear systems for wind turbines require lubrication during normal operation. For efficiency reasons it is sometimes desirable to provide lubrication to the gear system by means of a circulation system circulating a minimum amount of lubricant in such a manner that only an amount of lubricant necessary for lubricating the gear system during operation is present in the gear system at any time during normal operation. However, this has the disadvantage that in the case of an emergency, possibly causing the gear system to slow down or even stop, the gear system is left with insufficient lubrication. It has previously been attempted to address this problem.

GB 2 201 200 discloses a method of lubricating gear means for a wind energy installation. The method comprises the steps of maintaining operational lubrication by an oil-circulating system with injection lubrication, with the oil being cooled at the same time. The normal height of the oil level in the gear means casing is increased to a height necessary for splash lubrication when the rotational speed of the gear means falls below a settable value. To increase the height of the oil level, an additional quantity of oil is fed to the casing from a reservoir.

In the method disclosed in GB 2 201 200 it is necessary to measure the rotational speed of the gear means in order to detect that a situation is occurring which requires a higher oil level, and the reliability of the method is thereby dependent on the reliability of a sensor used for measuring the rotational speed.

DESCRIPTION OF THE INVENTION

It is an object of embodiments of the invention to provide a lubrication system for a gear system of a wind turbine, the lubrication system being adapted to switch between a normal operating mode and an emergency mode in an easy manner.

It is a further object of embodiments of the invention to provide a lubrication system for a gear system of a wind turbine, the lubrication system being adapted to automatically switch to an emergency mode in the case that an emergency situation is occurring.

The invention provides a lubrication system for a gear system for a wind turbine, the lubrication system comprising:
 a reservoir adapted to contain lubricant,
 first pump means arranged to supply lubricant from the reservoir to the gear system via a first fluid connection, and
 vacuum generating means arranged in fluid connection with the reservoir, thereby maintaining a total air pressure in the reservoir which is lower than an ambient pressure during normal operation
wherein the vacuum generating means is arranged to stop in the case that an emergency situation is occurring.

The lubricant is a substance which is suitable for lubricating the moving parts of the gear system. The lubricant is preferably a liquid, most preferably an oil. The lubrication system supplies the lubricant to the moving parts of the gear system.

The first pump means is arranged to supply lubricant from the reservoir to the gear system via the first fluid connection. This is preferably performed by substantially continuously pumping lubricant from the reservoir towards the gear system, via the first fluid connection, preferably in such a manner that the lubricant is distributed to each of the parts of the gear system which requires lubrication. Thereby a substantially continuous supply of lubricant is ensured to the moving parts of the gear system.

The first pump means may be or comprise a mechanically and/or an electrically driven pump. The pump may advantageously be of the kind having variable rotational speed, thereby making it possible to adjust the amount of lubricant being displaced by the pump. As an alternative, the pump may be of a kind having a fixed rotational speed.

The vacuum generating means is arranged in fluid connection with the reservoir. Accordingly, the vacuum generating means is able to create a vacuum, i.e. reducing the total air pressure, inside the lubricant containing reservoir. Thereby the total air pressure inside the reservoir is lower than an ambient pressure. This situation is upheld during normal operation. In the present context the term 'normal operation' should be interpreted to mean a situation where the first pump means is operating normally and as expected, and where the system is not performing a start-up procedure or similar.

In the present context the term 'total air pressure' should be interpreted to mean a pressure prevailing in a part of the reservoir which accommodates a gaseous medium, such as atmospheric air, including the static air pressure and the dynamic air pressure, i.e. $P_{total}=P_{static}+P_{dynamic}$. Thus, the term 'total air pressure' does not include a pressure prevailing in the part of the reservoir which accommodates lubricant.

In the present context the term 'ambient pressure' should be interpreted to mean a pressure prevailing in a region which is exterior with respect to the reservoir. The ambient pressure could, thus, be a pressure prevailing outside the lubrication system, such as inside a nacelle of a wind turbine comprising the lubrication system, or a pressure prevailing outside such a wind turbine. As an alternative, the ambient pressure could be an air pressure, e.g. the total air pressure, a static air pressure or a dynamic air pressure, prevailing in an interior part of the gear system to which the first reservoir is fluidly connected via the first fluid connection. It should be noted that the air pressure inside the gear system may be substantially identical to a pressure prevailing exterior to the lubrication system.

Since the vacuum generating means maintains a reduced pressure in the reservoir during normal operation as described above, the surface level of the lubricant contained in the reservoir is raised as compared to a situation where the vacuum generating means is not operating. Thereby lubricant is drawn out of the gear system and stored in the reservoir, i.e. the gear system is lubricated according to a 'dry sump method'. This has the advantage that less friction occurs as a result of the lubrication process, thereby reducing the losses introduced in the gear system and improving the efficiency of the gear system. Furthermore, the risk of fouling the interior parts of the gear system is reduced due to the smaller amount of lubricant being present in the gear system. Finally, the temperature of the moving parts of the gear system, notably the gear teeth, is reduced, since the moving parts are not submerged in relatively hot lubricant.

However, when the vacuum generating means is not operating fully, the surface level of the lubricant contained in the reservoir is lowered, and the amount of lubricant in the interior parts of the gear system is thereby increased. Thus, the gear system is, in this situation, lubricated according to a 'wet sump method'. In accordance with the present invention it is thereby possible to switch between a 'dry sump mode' and a 'wet sump mode', simply by switching the vacuum generating means on or off. Furthermore, in the case of a power failure, the vacuum generating means will automatically be switched off, thereby switching the lubrication system to the 'wet sump mode'. This will be described in further detail below.

The vacuum generating means is arranged to stop in the case that an emergency situation is occurring. An emergency situation could, e.g., be a power failure or a failure on or breakdown of the first pump means. In this case the first pump means will typically stop operating, i.e. the supply of lubricant to the gear system is interrupted. If the lubrication system continues to operate with a small amount of lubricant in the gear system, i.e. in a 'dry sump mode', under these circumstances, insufficient lubrication will be supplied to the moving parts of the gear system. However, according to the invention, the vacuum generating means stops when such an emergency situation occurs. This causes an increase in the total air pressure in the reservoir, thereby lowering the surface level of the lubricant contained in the reservoir and increasing the amount of lubricant in the interior parts of the gear system. Thus, the lubrication system is automatically switched to a 'wet sump mode' when an emergency situation of the kind described above is occurring. This is an advantage because it is thereby prevented that the gear system is operated with insufficient lubrication, and the risk of failure is reduced. In the case of a power failure, the vacuum generating means will typically automatically stop operating. In the case that the emergency situation is of another kind, one or more sensors may be provided to detect the emergency situation and cause the vacuum generating means to stop.

The vacuum generating means may additionally be manually switchable between an ON state in which it maintains a low total air pressure in the reservoir, and an OFF state in which it does not maintain a low total air pressure in the reservoir. Thereby it is possible to stop the vacuum generating means in situations where it is desirable to operate the lubrication system with a larger amount of lubricant in the gear system, i.e. in a 'wet sump mode'. This may, e.g., be desirable during start-up of the gear system or when the gear system is operating at low speed. During start-up the temperature of the lubricant is typically relatively low, and it is therefore desirable to operate the gear system in a 'wet sump mode' until the temperature of the lubricant has reached a certain level. When the gear system is operating at low speed, it is also desirable to have an additional amount of lubricant in the gear system.

The lubrication system may further comprise a second fluid connection fluidly interconnecting the gear system and the reservoir. The second fluid connection may advantageously be a return path allowing lubricant to flow from the gear system towards the reservoir when the first pump means supplies lubricant from the reservoir to the gear system. Thereby the reservoir, the first fluid connection, the gear system and the second fluid connection in combination form a closed lubricant circuit.

The lubrication system may further comprise a valve arranged in the second fluid connection, said valve being shiftable between a first position in which a flow of lubricant is allowed between the gear system and the reservoir, via the second fluid connection and the valve, and a second position in which such a flow of lubricant is prevented. According to this embodiment, the valve may advantageously be in the first position during normal operation and in the second position during an emergency. When the valve is in the second position, the lubricant circuit described above is interrupted. A filter may be arranged in the second fluid connection, fluidly in parallel with the valve, in order to allow lubricant to flow between the reservoir and the gear system, thereby providing equalisation of the lubricant levels, in a controlled manner, and in a manner which prevents dirt and debris from passing along with the lubricant between the reservoir and the gear system.

The vacuum generating means may comprise second pump means. The second pump means may be or comprise a mechanically or electrically driven pump. The pump may be of a kind having variable rotational speed, thereby allowing the adjustment of the total air pressure inside the reservoir. As an alternative, the pump may be of a kind having a fixed rotational speed. The pump may, e.g., be a positive displacement vacuum pump, such as a peristaltic pump, a rotary vane pump, a piston pump, a liquid ring vacuum pump, etc. As an alternative, the pump may be a centrifugal vacuum pump.

Alternatively or additionally, the vacuum generating means may be or comprise a fan.

The pressure in the reservoir may determine a lubricant level in the gear system. This may be obtained due to the fact that the reservoir and the interior parts of the gear system are fluidly interconnected, at least via the first fluid connection, and possibly via the second fluid connection. As described above, when the total air pressure in the reservoir is lowered by means of the vacuum generating means, lubricant is sucked from the gear system towards the reservoir, via the fluid connection(s). Thereby the lubricant level in the reservoir is increased and the lubricant level in the gear system is decreased. Similarly, if the vacuum generating means is stopped, the total air pressure in the reservoir increases. This causes lubricant to flow from the reservoir towards the gear system, thereby decreasing the lubricant level in the reservoir and increasing the lubricant level in the gear system.

The lubrication system may further comprise a venting connection arranged between the reservoir and the gear system. The venting connection ensures that gaseous medium, such as air, which is transferred from the reservoir is received in the gear system. Similarly, gaseous medium which is transferred from the gear system is received in the reservoir. This is an advantage because such gaseous medium may contain residues of lubricant, and the venting connection ensures that such residues of lubricant do not leave the lubrication system, i.e. it remains inside the reservoir or the gear system. Thereby lubricant loss in the system as well as pollution of the environment is minimised. Furthermore, the venting connection may be used for equalising the air pressures in the reservoir and the interior part of the gear system during emergency operation, e.g. in case of a power failure.

The vacuum generating means may be arranged in the venting connection. According to this embodiment, the vacuum generating means is arranged to suck gaseous medium, such as air, out of the reservoir and into the gear system.

The vacuum generating means may be arranged to maintain a total air pressure in the reservoir which is lower than a total air pressure in an interior part of the gear system. According to this embodiment, the 'ambient pressure' may be regarded as the total air pressure in the interior part of the gear system. Since the total air pressure in the reservoir is lower than the total air pressure in the interior part of the gear system it is ensured that lubricant is transferred from the gear system into the reservoir in response to the operation of the vacuum generating means.

The invention further relates to a gear system comprising a lubrication system according to the invention and a wind turbine comprising such a gear system. The gear system is preferably of the kind which is used in a drive train of a wind turbine.

BRIEF DESCRIPTION OF THE DRAWINGS

The invention will now be described in further detail with reference to the accompanying drawings in which.

DETAILED DESCRIPTION OF THE DRAWINGS

Figure 1:
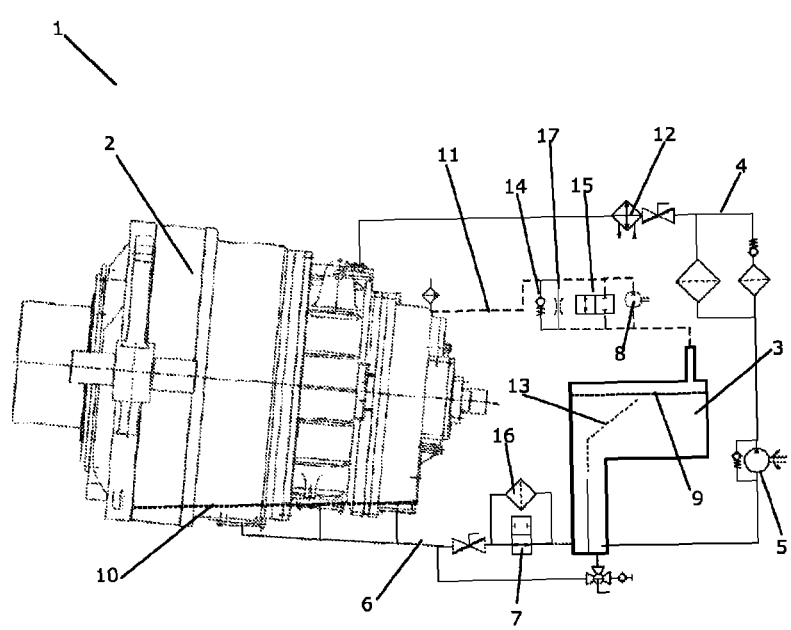
FIG. 1 is a diagrammatic view of a lubrication system according to an embodiment of the invention during dry operation.

FIG. 1 is a diagrammatic view of a lubrication system 1 according to an embodiment of the invention. FIG. 1 shows the lubrication system 1 during dry operation. The lubrication system 1 is normally in this state during normal operation. A gear system 2 is adapted to be arranged in a drive train of a wind turbine (not shown). A reservoir 3 contains lubricant and is fluidly connected to the gear system 2. Accordingly, lubricant is supplied from the reservoir 3 to the gear system 2, via fluid line 4 and by means of pump 5. Lubricant returns from the gear system 2 to the reservoir 3 via return fluid line 6. Valve 7 is in an open state in FIG. 1, illustrating that the lubricant is allowed to return to the reservoir 3 via return fluid line 6.

A vacuum pump 8 is connected to the reservoir 3. During normal operation the vacuum pump 8 sucks air out of the reservoir 3, thereby lowering the total air pressure inside the reservoir 3 as compared to a total air pressure prevailing in the gear system 2. This has the consequence that lubricant is sucked from the gear system 2 into the reservoir 3, and the lubricant level 9 in the reservoir 3 is therefore increased while the lubricant level 10 in the gear system 2 is decreased. This is illustrated in FIG. 1 by the lubricant level 10 in the gear system 2 being lower than the lubricant level 9 in the reservoir 3. Accordingly, the lubricant level 10 in the gear system 2 is only sufficient to ensure proper lubrication of the moving parts of the gear system 2 as long as a substantially continuous supply of lubricant is provided by the pump 5, and as long as the gear system 2 is running at a speed above a certain threshold speed.

The vacuum pump 8 is arranged in a venting connection 11 interconnecting the reservoir 3 and the gear system 2. Accordingly, the gaseous medium, e.g. air, which is sucked out of the reservoir 3 by the vacuum pump 8 in order to maintain the lowered total air pressure in the reservoir 3 is received in the gear system 2. Thereby residues of lubricant which may be present in the gaseous medium are received in the gear system 2 rather than being sucked out of the lubrication system 1. This reduces the loss of lubricant in the lubrication system 1 and minimises the risk of pollution of the environment.

The total air pressure in the reservoir 3 should be selected in such a manner that a desired and suitable lubricant level 9 in the gear system 2 for this purpose is obtained. The operation of the vacuum pump 8 should be adjusted in order to obtain this.

Cooling element 12 is arranged in fluid line 4 in order to cool the circulated lubricant. As the lubricant passes through the gear system 2, the temperature of the lubricant increases. Accordingly, the temperature of the circulated lubricant would automatically increase for each cycle if no cooling was provided. Accordingly, the cooling element 12 ensures that the temperature of the lubricant does not exceed an acceptable level.

A baffle 13 is arranged in the reservoir 3. This ensures that the lubricant received from the gear system 2 via return fluid line 6 is not immediately pumped towards the gear system 2 via fluid line 4. Instead most of the lubricant is forced upwards along the baffle 13 and mixed with the lubricant which is already present in the reservoir 3. Thereby it is ensured that the entire amount of available lubricant is circulated in the lubrication system 1.

A safety valve 14 is provided in the venting connection 11 fluidly in parallel with the vacuum pump 8. In the case that the total air pressure in the reservoir 3 drops below a threshold value corresponding to the lowest acceptable lubricant level 10 in the gear system 2, safety valve 14 opens, thereby increasing the total air pressure in the reservoir 3 until the total air pressure is once again above the threshold value. Then the safety valve 14 closes again.

Valve 15 is in a closed state in FIG. 1, thereby preventing gaseous medium from flowing from the gear system 2 towards the reservoir 3 via the venting connection 11. This allows the vacuum pump 8 to maintain the low total air pressure in the reservoir 3.

Figure 2:
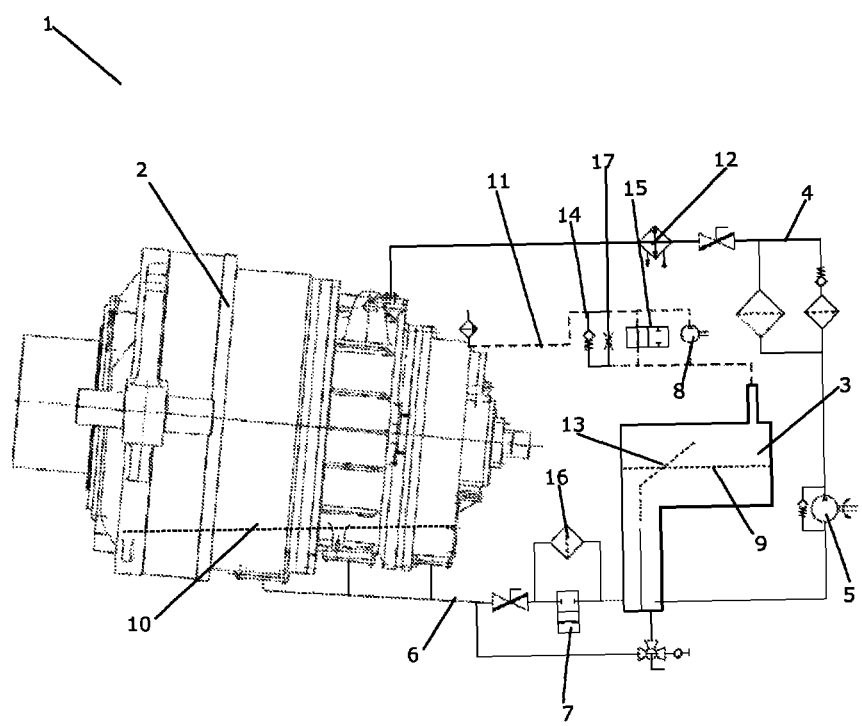
FIG. 2 is a diagrammatic view of the lubrication system of FIG. 1 during emergency operation.

FIG. 2 is a diagrammatic view of the lubrication system 1 of FIG. 1. However, in FIG. 2 the lubrication system 1 is shown during emergency operation. The emergency may, e.g., be caused by a power failure or another kind of failure or breakdown of the pump 5. Under such circumstances, a substantially continuous supply of lubricant is no longer provided to the gear system 2 via fluid line 6. In response to the emergency situation, the vacuum pump 8 has been stopped. This causes the total air pressure in the reservoir 3 to increase. As a consequence, the lubricant level 9 in the reservoir 3 is decreased and the lubricant level 10 in the gear system 2 is increased until the lubricant levels 9, 10 are substantially identical. In FIG. 2 the lubricant level 9 in the reservoir 3 is lower than the level shown in FIG. 1, and the lubricant level 10 in the gear system 2 is higher than the level shown in FIG. 1. However, the equilibrium situation where the lubricant levels 9, 10 are identical has not yet been reached.

Valve 7 has been moved to a closed state, thereby preventing lubricant from flowing between the gear system 2 and the reservoir 3 via the return fluid line 6 and the valve 7. However, the lubricant levels 9, 10 are equalised by allowing lubricant to flow through the return fluid line 6 via filter 16. This gives a somewhat slower equalisation of the lubricant levels 9, 10. However, dirt and debris is prevented from passing the filter 16, thereby removing such dirt and debris from the lubricant.

Valve 15 has been moved to an open state, thereby allowing gaseous medium to pass between the gear system 2 and the reservoir 3 via venting connection 11, thereby allowing equalisation of the total air pressure in the reservoir 3 and the total air pressure in the gear system 2. In the case that an emergency occurs and the valve 15 is not moved to the open state, pressure equalisation is obtained via flow restrictor 17 when vacuum pump 8 is not operating.

In summary, in the case of an emergency, as illustrated in FIG. 2, the lubricant level 10 in the gear system 2 is increased, thereby ensuring that sufficient lubricant is present in the gear system 2 to allow the lubrication system 1 to be operated in a 'wet sump mode'. Thereby the gear system 2 will receive sufficient lubrication, even if pump 5 is not operating, i.e. if no lubricant is supplied to the gear system 2 via fluid line 4.

Figure 3:
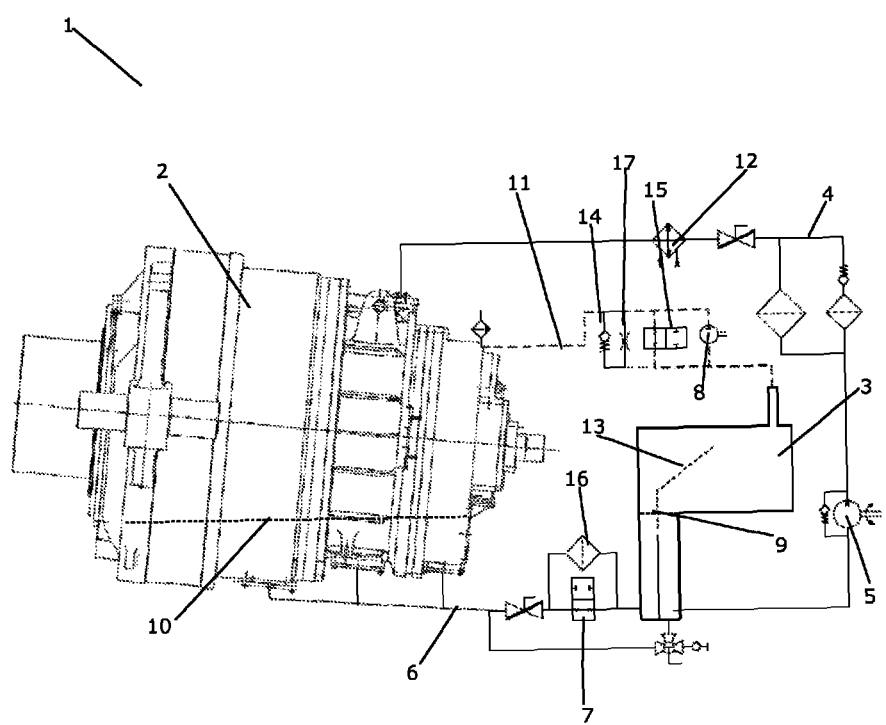
FIG. 3 is a diagrammatic view of the lubrication system of FIGS. 1 and 2 during wet operation.

FIG. 3 is a diagrammatic view of the lubrication system 1 of FIGS. 1 and 2. However, in FIG. 3 the lubrication system 1 is shown during wet operation. In FIG. 3 lubricant levels 9, 10 have reached equilibrium, i.e. the levels 9, 10 are shown at the same level. Valve 7 has been moved to the open state, thereby allowing lubricant to flow from the gear system 2 towards the reservoir 3 via return fluid line 6. Accordingly, if pump 5 is operating, lubricant can be circulated from the reservoir 3 to the gear system 2 via fluid line 4, and back to the reservoir 3 via return fluid line 6. Thus, the lubrication system 1 is operated essentially as described above with reference to FIG. 1, except that the vacuum pump 8 is not operating, and the total air pressure in the reservoir 3 is therefore higher than it is the case in the situation illustrated in FIG. 1. In the case that pump 5 is not operating, the gear system 2 is lubricated by means of the lubricant present in the gear system 2 and the movements of the moving parts of the gear system 2.

The situation illustrated in FIG. 3 may, e.g., be during start-up of the gear system 2, in which case it may be desirable to operate the lubrication system 1 in a 'wet sump mode', e.g. until the gear system 2 has reached a desired speed, or until the temperature of the lubricant has reached a suitable level.

The invention claimed is:

1. A lubrication system for a gear system for a wind turbine, the lubrication system comprising:
    a reservoir adapted to contain lubricant so as to define a gas space within the reservoir above the lubricant,
    a first pump arranged to supply lubricant from the reservoir to the gear system via a first fluid connection,
    a venting connection arranged between the reservoir and the gear system, the venting connection configured to transfer gas between the gas space of the reservoir and the gear system, and
    a vacuum generator arranged in fluid connection with the gas space of the reservoir and operable in a first operation state of the lubrication system to transfer gas from the gas space to the gear system through the venting connection, thereby maintaining a total gas pressure in the reservoir which is lower than an ambient pressure, wherein the vacuum generator is arranged to stop during a second operation state of the lubrication system.

2. The lubrication system according to claim 1, further comprising a second fluid connection fluidly interconnecting the gear system and the reservoir.

3. The lubrication system according to claim 2, further comprising a valve arranged in the second fluid connection, said valve being shiftable between a first position in which a flow of lubricant is allowed between the gear system and the reservoir, via the second fluid connection and the valve, and a second position in which such a flow of lubricant is prevented.

4. The lubrication system according claim 1, wherein the vacuum generator comprises a second pump.

5. The lubrication system according claim 1, wherein the pressure in the reservoir determines a lubricant level in the gear system.

6. The lubrication system according to claim 1, wherein the vacuum generator is arranged in the venting connection.

7. The lubrication system according claim 1, wherein the vacuum generator is arranged to maintain a total air pressure in the reservoir which is lower than a total air pressure in an interior part of the gear system.

8. A gear system comprising a lubrication system according to claim 1.

9. A wind turbine comprising a gear system according to claim 8.

10. The lubrication system according to claim 1, wherein during the second operation state of the lubrication system gas is permitted to flow into the gas space of the reservoir through the venting connection.

11. The lubrication system according to claim 1, further comprising a valve arranged in fluid communication with the venting connection, wherein during the first operation state of the lubrication system the valve is positioned to prevent gas from flowing from the gear system into the gas space of the reservoir, and during the second operation state of the lubrication system the valve is positioned to permit gas to flow from the gear system into the gas space of the reservoir.

12. A method of lubricating a gear system for a wind turbine having a reservoir that contains a lubricant so as to define a gas space within the reservoir above the lubricant, the method comprising:
    selectively decreasing the amount of lubricant in the gear system by transferring gas out the gas space of the reservoir and into the gear system, and thereby increasing the difference between a total gas pressure within the gas space of the reservoir and an ambient pressure; and
    selectively increasing the amount of lubricant in the gear system by permitting gas to flow into the gas space of the reservoir from the gear system, and thereby decreasing the difference between the total gas pressure within the gas space of the reservoir and the ambient pressure.

13. The method according to claim 12, wherein selectively decreasing the amount of lubricant in the gear system further comprises applying a vacuum to the gas space of the reservoir so as to increase the difference between the total gas pressure within the gas space of the reservoir and the ambient pressure.

14. The method according to claim 12, wherein selectively increasing the amount of lubricant in the gear system further comprises ceasing to apply a vacuum to the gas space of the reservoir so as to decrease the difference between the total gas pressure within the gas space of the reservoir and the ambient pressure.

* * * * *

UNITED STATES PATENT AND TRADEMARK OFFICE
CERTIFICATE OF CORRECTION

PATENT NO. : 8,997,934 B2  
APPLICATION NO. : 13/503197  
DATED : April 7, 2015  
INVENTOR(S) : Thomas Korsgaard Nielsen Page 1 of 1

It is certified that error appears in the above-identified patent and that said Letters Patent is hereby corrected as shown below:

In the Specification:

Column 6, line 53, change "is" to --are--

In the Claims:

Column 8, line 1, claim 4, after "according" insert --to--
Column 8, line 3, claim 5, after "according" insert --to--
Column 8, line 8, claim 7, after "according" insert --to--

Signed and Sealed this  
Twenty-ninth Day of December, 2015

Michelle K. Lee  
*Director of the United States Patent and Trademark Office*